US012565236B2

(12) United States Patent
Song et al.

(10) Patent No.: US 12,565,236 B2
(45) Date of Patent: Mar. 3, 2026

(54) METHOD FOR CONTROLLING AUTONOMOUS VEHICLE

(71) Applicant: ELECTRONICS AND TELECOMMUNICATIONS RESEARCH INSTITUTE, Daejeon (KR)

(72) Inventors: Yoo-Seung Song, Daejeon (KR); Shin-Kyung Lee, Daejeon (KR); Kyoung-Wook Min, Sejong-si (KR); Jeong-Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 296 days.

(21) Appl. No.: 18/311,794

(22) Filed: May 3, 2023

(65) Prior Publication Data

US 2024/0010237 A1      Jan. 11, 2024

(30) Foreign Application Priority Data

Jul. 6, 2022      (KR) ........................ 10-2022-0083084

(51) Int. Cl.
B60W 60/00          (2020.01)
B60W 30/09          (2012.01)
B60W 30/095        (2012.01)

(52) U.S. Cl.
CPC ........ B60W 60/0015 (2020.02); B60W 30/09 (2013.01); B60W 30/0956 (2013.01); B60W 2554/80 (2020.02); B60W 2756/10 (2020.02)

(58) Field of Classification Search
CPC ....... B60W 60/00276; B60W 2552/05; B60W 2552/10; B60W 2554/4041;
(Continued)

(56) References Cited

U.S. PATENT DOCUMENTS

2017/0297622 A1*   10/2017   Niemz ................... G08G 1/166
2019/0096144 A1*    3/2019   Noh ...................... H04W 12/66
(Continued)

FOREIGN PATENT DOCUMENTS

DE      10 2018 002 675       10/2019
KR      10-2019-0115464       10/2019
KR      10-2021-0072226        6/2021

OTHER PUBLICATIONS

By Aoki and R. Rajkumar, "A Merging Protocol for Self-Driving Vehicles," 2017 ACM/IEEE 8th International Conference on Cyber-Physical Systems (ICCPS), Pittsburgh, PA, USA, 2017, pp. 219-228. (Year: 2017).*
(Continued)

*Primary Examiner* — Russell Frejd
*Assistant Examiner* — Ana D Thomas
(74) *Attorney, Agent, or Firm* — KILE PARK REED & HOUTTEMAN PLLC

(57)      ABSTRACT

Disclosed herein is a method of controlling an autonomous vehicle driving in a lane of a main line. The method may include determining whether the autonomous vehicle is driving in a target lane to accommodate merging traffic, determining whether a merge request message is received from a merging vehicle when the autonomous vehicle is determined to drive in the target lane, determining whether a collision with the merging vehicle will occur based on the merge request message when the merge request message is received, and sending a merge approval message to the merging vehicle when the collision with the merging vehicle is expected.

20 Claims, 12 Drawing Sheets

(58) Field of Classification Search
CPC . B60W 2554/4045; B60W 2554/4049; B60W
2554/802; B60W 2556/40; B60W
2552/53; B60W 30/18163; G08G 1/167
See application file for complete search history.

(56)                    References Cited

U.S. PATENT DOCUMENTS

| | | |
|---|---|---|
| 2020/0079379 A1* | 3/2020 | Mimura ................ B60W 10/04 |
| 2020/0174475 A1 | 6/2020 | Min et al. |
| 2021/0300418 A1* | 9/2021 | Alvarez ........... G08G 1/096791 |
| 2022/0041180 A1 | 2/2022 | Choi et al. |
| 2022/0227394 A1 | 7/2022 | Wray et al. |

OTHER PUBLICATIONS

Maksimovski, Daniel, Christian Facchi, and Andreas Festag. "Priority Maneuver (PriMa) coordination for connected and automated vehicles." 2021 IEEE International Intelligent Transportation Systems Conference (ITSC). IEEE, 2021. (Year: 2021).*

Aoki and R. Rajkumar, "A Merging Protocol for Self-Driving Vehicles," 2017 ACM/IEEE 8th International Conference on Cyber-Physical Systems (ICCPS), Pittsburgh, PA, USA, 2017, pp. 219-228. (Year: 2017).*

Semsar-Kazerooni et al., "Interaction protocols for cooperative merging and lane reduction scenarios", 2015 IEEE 18th International Conference on Intelligent Transportation Systems, 2015, pp. 1964-1970.

* cited by examiner

METHOD FOR CONTROLLING AUTONOMOUS VEHICLE

CROSS REFERENCE TO RELATED APPLICATION

This application claims the benefit of Korean Patent Application No. 10-2022-0083084, filed Jul. 6, 2022, which is hereby incorporated by reference in its entirety into this application.

BACKGROUND OF THE INVENTION

1. Technical Field

The present disclosure relates to a communication protocol and driving control technology required for cooperative driving between vehicles.

2. Description of the Related Art

An autonomous driving system is technology for selecting the optimal driving path and realizing autonomous driving using lane departure prevention technology, vehicle change control technology, obstacle avoidance control technology, and the like. The autonomous driving system indicates technology related to driving of a vehicle that reaches a destination by itself even though a driver does not manipulate a steering wheel, an accelerator pedal, a brake pedal, or the like.

An autonomous vehicle includes a vehicle communication device (an on-board unit (OBU)) installed therein, thereby providing various vehicle-to-everything (V2X) communication services. The V2X service provides various types of services, such as a service for calling attention to an accident, traffic, falling objects, or the like on a road, a service for providing information about the weather or a road condition in the region in which the vehicle is driving, a detailed map service for giving information about objects in the region in which the vehicle is driving, and the like.

These days, the V2X service provides not only alert or warning services but also a service for directly helping a driver. For example, a service for providing real-time road condition information, an information sharing service for sharing information recognized by a nearby vehicle, a group service for driving vehicles in groups depending on the control command of the leading vehicle, and the like are being provided.

As the autonomous driving level of autonomous vehicles becomes higher, the development of support services required for actual road driving, e.g., merging from the right side, a lane change, cutting in traffic, and the like, is underway, but there is a problem in which direct provision of a service for road driving is impossible with the V2X service.

SUMMARY OF THE INVENTION

An object of the present disclosure is to propose a communication protocol required for various types of driving of vehicles using V2X communication technology and to provide an autonomous vehicle control method for controlling the vehicles based thereon.

Another object of the present disclosure is to provide an autonomous vehicle control method for effectively performing cooperative driving through cooperation with nearby vehicles.

In order to accomplish the above objects, a method for controlling an autonomous vehicle driving in a lane of a main line according to the present disclosure may include determining whether the autonomous vehicle is driving in a target lane to accommodate merging traffic, determining whether a merge request message is received from a merging vehicle when the autonomous vehicle is driving in the target lane, determining whether a collision with the merging vehicle will occur based on the merge request message when the merge request message is received, and sending a merge approval message to the merging vehicle when the collision with the merging vehicle is expected.

The merge request message may include driving lane information of the merging vehicle and the estimated time of arrival of the merging vehicle at a merging point.

Determining whether the collision with the merging vehicle will occur may include calculating the estimated time of arrival of the autonomous vehicle at the merging point and determining whether the collision with the merging vehicle will occur based on the estimated time of arrival of the autonomous vehicle at the merging point and the estimated time of arrival of the merging vehicle at the merging point.

Whether the collision with the merging vehicle will occur may be determined by comparing the difference between the estimated time of arrival of the autonomous vehicle at the merging point and the estimated time of arrival of the merging vehicle at the merging point with a preset threshold value.

The merge approval message may include driving lane information of the autonomous vehicle and the estimated time of arrival of the autonomous vehicle at the merging point.

The method may further include controlling, by the autonomous vehicle, the speed of the autonomous vehicle so as to prevent the collision with the merging vehicle.

The merge request message and the merge approval message may be periodically sent until merging of the merging vehicle is completed.

Also, a method for controlling an autonomous vehicle to merge into a target lane according to an embodiment may include calculating the estimated time of arrival of the autonomous vehicle at a merging point when a Basic Safety Message (BSM) is received from a vehicle driving in the target lane, sending a merge request message including driving lane information of the autonomous vehicle and the estimated time of arrival of the autonomous vehicle at the merging point to the vehicle driving in the target lane, determining whether a merge approval message is received from the vehicle driving in the target lane, determining whether a collision with the vehicle driving in the target lane will occur based on the merge approval message when the merge approval message is received, and controlling the speed of the autonomous vehicle when the collision with the vehicle driving in the target lane is expected.

The merge approval message may include driving lane information of the vehicle driving in the target lane and the estimated time of arrival of the vehicle driving in the target lane at the merging point.

Whether the collision with the vehicle driving in the target lane will occur may be determined based on the estimated time of arrival of the autonomous vehicle at the merging point and the estimated time of arrival of the vehicle driving in the target lane at the merging point.

Whether the collision with the vehicle driving in the target lane will occur may be determined by comparing the difference between the estimated time of arrival of the autonomous vehicle at the merging point and the estimated time of arrival of the vehicle driving in the target lane at the merging point with a preset threshold value.

Also, a method for controlling an autonomous vehicle according to an embodiment may include calculating the estimated time of arrival of the autonomous vehicle at a merging point based on a remaining distance to the merging point, sending an approach notification message including the estimated time of arrival of the autonomous vehicle at the merging point to a nearby vehicle, determining whether a collision with the nearby vehicle will occur based on an approach recognition message when the approach recognition message is received from the nearby vehicle, and controlling the autonomous vehicle so as to prevent the collision with the nearby vehicle when the collision with the nearby vehicle is expected.

Calculating the estimated time of arrival of the autonomous vehicle at the merging point may include calculating the remaining distance of the autonomous vehicle to the merging point in the state in which the autonomous vehicle is driving in a target lane and calculating the estimated time of arrival of the autonomous vehicle at the merging point when the remaining distance is less than a preset distance.

The approach recognition message may include the estimated time of arrival of the nearby vehicle at the merging point.

Whether the collision with the nearby vehicle will occur may be determined based on the estimated time of arrival of the autonomous vehicle at the merging point and the estimated time of arrival of the nearby vehicle at the merging point.

Whether the collision with the nearby vehicle will occur may be determined by comparing the difference between the estimated time of arrival of the autonomous vehicle at the merging point and the estimated time of arrival of the nearby vehicle at the merging point with a preset threshold value.

The autonomous vehicle may be a vehicle driving in a target lane and the nearby vehicle may be a merging vehicle to merge into the target lane. The vehicle driving in the target lane may be controlled to change a lane or to increase or decrease the speed thereof in order to prevent a collision with the merging vehicle.

The autonomous vehicle may be a merging vehicle to merge into a target lane, and the nearby vehicle may be a vehicle driving in the target lane. The merging vehicle may be controlled to decrease the speed thereof in order to prevent a collision with the vehicle driving in the target lane.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
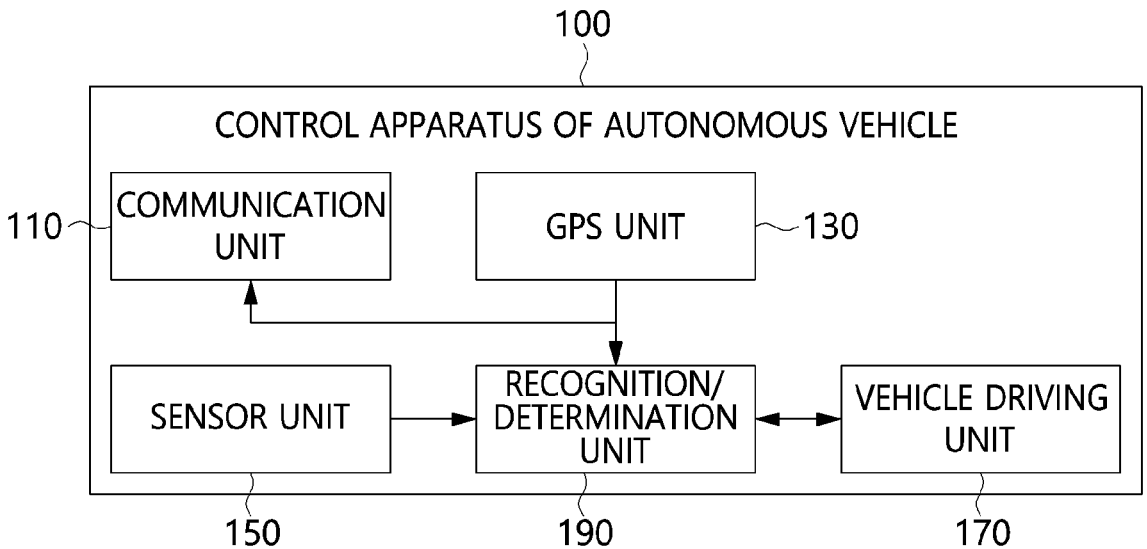
FIG. 1 is a block diagram illustrating an apparatus for controlling an autonomous vehicle according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a block diagram illustrating an apparatus for controlling an autonomous vehicle according to an embodiment of the present disclosure.

Referring to FIG. 1, the apparatus 100 for controlling an autonomous vehicle according to an embodiment may include a communication unit 110, a GPS unit 130, a sensor unit 150, a vehicle driving unit 170, and a recognition/determination unit 190.

The communication unit 110 may support communication with another vehicle or nearby infrastructure using V2X communication technology, which uses LTE, WAVE, or the like. The communication unit 110 may transfer information to the recognition/determination unit 190 or transfer information generated by the recognition/determination unit 190 to surroundings.

The GPS unit 130 may acquire information about the location of the autonomous vehicle, speed information thereof, and the like.

The sensor unit 150 may include a sensor, such as a camera, LiDAR, radar, or the like. The sensor unit 150 may acquire information about objects on a driving road or environment information. The sensor unit 150 may transfer the object information and the environment information to the recognition/determination unit 190.

The vehicle driving unit 170 may control the movement of the vehicle, such as the speed of the vehicle, the direction thereof, and the like.

The recognition/determination unit 190 may collect strategies required for cooperative driving using the information collected by the sensor unit 150 and the information shared through the communication unit 110, and may share the information through V2X. The recognition/determination unit 190 may provide speed and steering information required for the control of the vehicle. Here, the recognition/determination unit 190 may be formed of software, but is not limited thereto.

The apparatus 100 for controlling an autonomous vehicle according to an embodiment may collect information and control the vehicle according to the following scenario of cooperative driving between vehicles.

Figure 2:
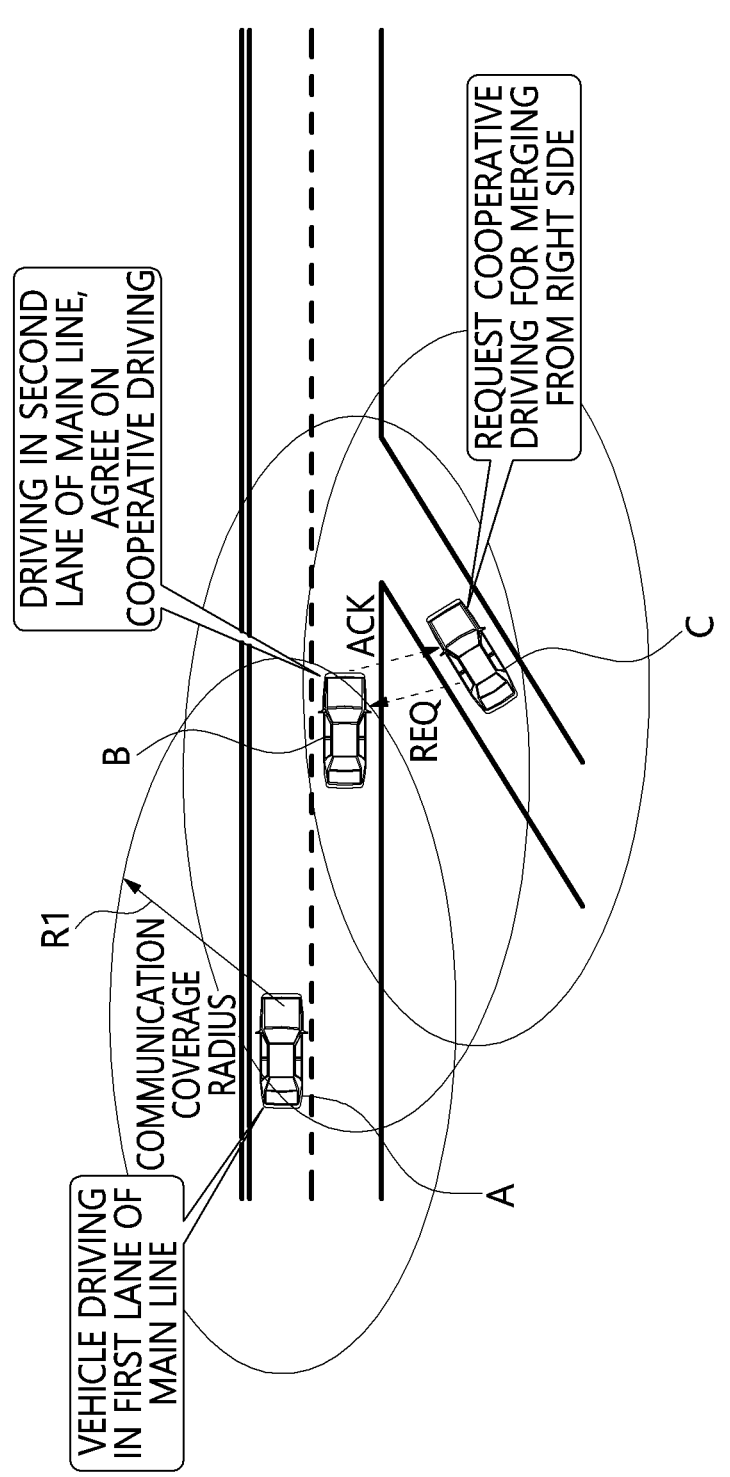
FIG. 2 is a view illustrating a cooperative driving scenario in a merging zone according to a first embodiment of the present disclosure.

FIG. 2 is a view illustrating a scenario of cooperative driving in a merging zone according to a first embodiment of the present disclosure.

As illustrated in FIG. 2, a first vehicle A is driving in the first lane of a main line, a second vehicle B is driving in the second lane of the main line, and a merging vehicle C that wants to merge from the right side is driving on an on-ramp. Here, the vehicles A and B and the merging vehicle C may be autonomous vehicles, but are not limited thereto.

The vehicles A and B driving on the main line and the merging vehicle C are required to perform cooperative driving therebetween. Here, a communication device capable of V2X communication is installed in each of the vehicles, and it may have a communication coverage radius R1 corresponding to a certain range.

Merging onto the main line may be attempted using a reactive method in which the first vehicle A, the second vehicle B, and the merging vehicle C exchange cooperative driving messages required for merging from the right side.

The merging vehicle C may merge from the right side using a reactive method in which it receives a Basic Safety Message (BSM) broadcast by the vehicles A and B driving on the main line and reacts thereto after determining whether the message is related to the merging vehicle itself. Here, the BSM includes speed and location information of the driving vehicle, and the vehicles A and B driving on the main line may provide the speed and location information thereof to the merging vehicle C.

Figure 3:
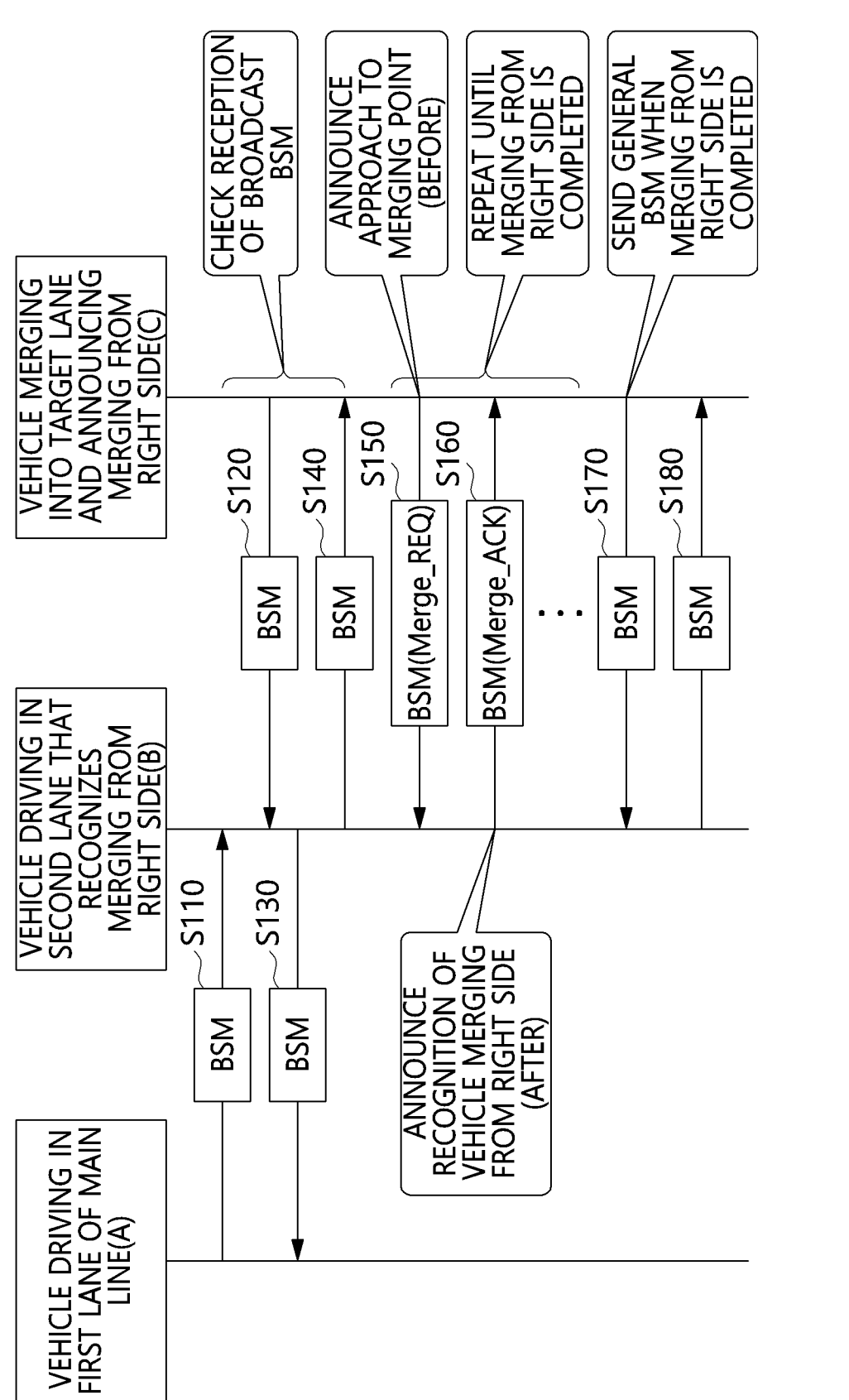
FIG. 3 is a view illustrating a driving negotiation protocol in a merging zone according to the first embodiment of the present disclosure.

FIG. 3 is a view illustrating a driving negotiation protocol in a merging zone according to the first embodiment of the present disclosure.

As illustrated in FIG. 3, a vehicle driving on a main line and a merging vehicle that wants to merge into a target lane broadcast BSMs, thereby providing the driving information thereof.

For example, a first vehicle A driving in the first lane of the main line may send a BSM to a second vehicle B driving in the second lane of the main line at step S110. A merging vehicle C may send a BSM to the second vehicle B at step S120. The second vehicle B may send a BSM to the first vehicle A at step S130. The second vehicle B may send a BSM to the merging vehicle C at step S140.

When it approaches a merging point, the merging vehicle C driving on an on-ramp on the right side receives messages broadcast by the vehicles driving on the main line, and when it determines that there is a vehicle involved in the merging vehicle C itself when it merges, the merging vehicle C may add a merge request message (Merge_REQ) to a BSM and send the BSM to surroundings at step S150.

When the vehicles A and B driving on the main line receive the BSM, to which the merge request message of the merging vehicle C to enter the rightmost lane of the main line is added, the vehicles A and B may check whether they are involved in the merging vehicle C.

When it is determined that the second vehicle B driving in the second lane of the main line is involved in the merging vehicle C, the second vehicle B may add a merge approval message (Merge_ACK) to a BSM and send the BSM at step S160.

The second vehicle B and the merging vehicle C broadcast the BSMs including the merge request message and the merge approval message at regular intervals, and the BSMs may be repeatedly broadcast until merging from the right side is completed.

When merging from the right side is completed, the merging vehicle C may broadcast a BSM that does not include a merge request message to surroundings at step S170. The vehicles driving on the main line may broadcast a BSM that does not include a merge approval message to surroundings at step S180.

As described above, the vehicles driving on the main line and the merging vehicle exchange a merge request message and a merge approval message, whereby cooperative driving may be quickly performed.

Figure 4:
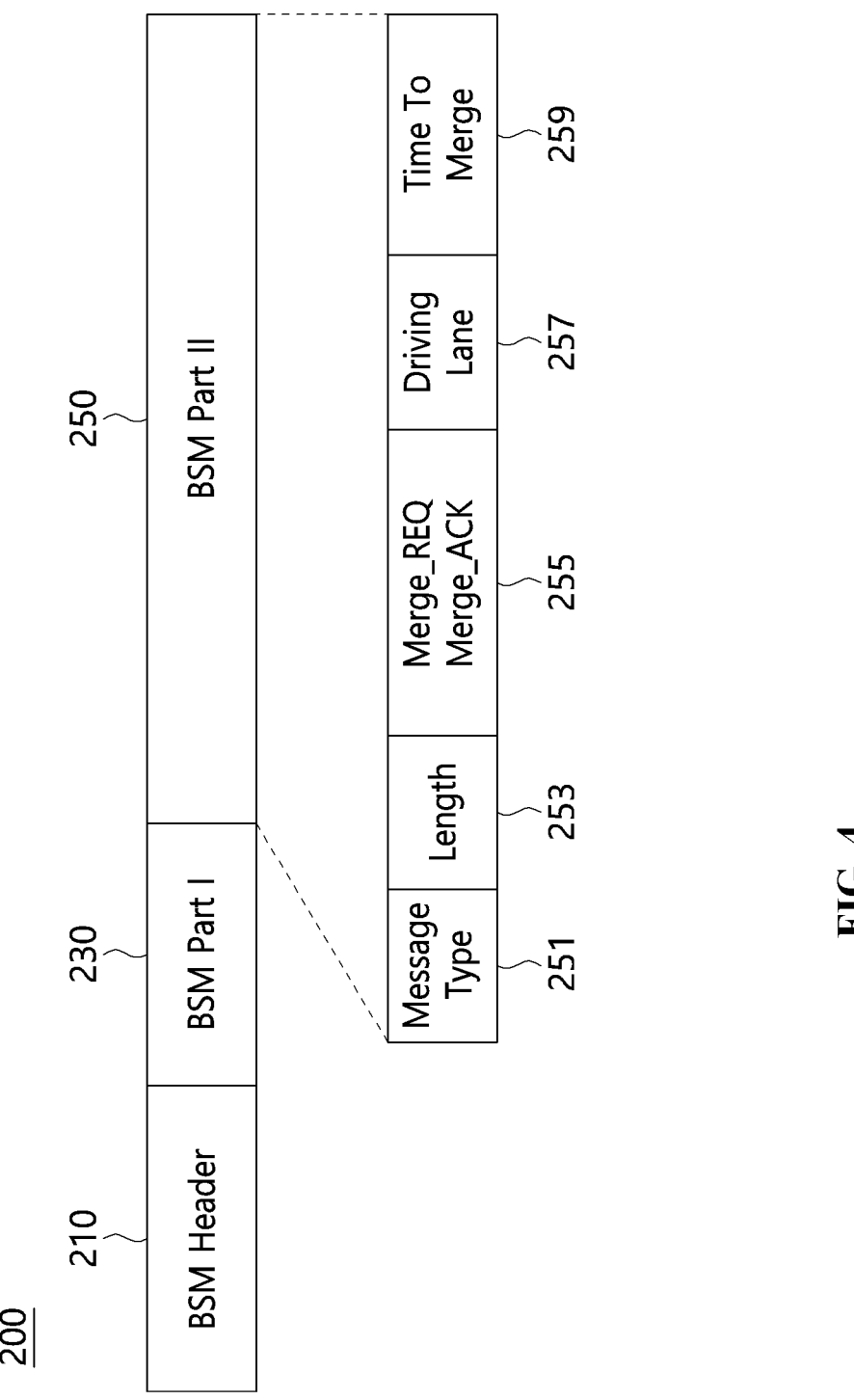
FIG. 4 is a view illustrating a message frame format according to the first embodiment of the present disclosure.

FIG. 4 is a view illustrating a message frame format according to the first embodiment of the present disclosure.

As illustrated in FIG. 4, a BSM 200 according to the first embodiment may be configured such that a BSM header 210, which is frame header information for sending the BSM, is located at the front of the BSM. After the BSM header 210, BSM part 1 230 for broadcasting speed and location information, which is basic driving information of a vehicle, may be located. BSM part 1 may be a general BSM.

After BSM part 1 230, BSM part 2, including a message type field 251, a length field 253, a Merge_REQ or Merge_ACK field 255, a driving lane field 257, and a time-to-merge field 259, may be located. Here, BSM part 2 250 may be a region including merge request message information or merge approval message information.

The message type field 251 may include information indicating that the message is related to a driving negotiation for merging from the right side. The length field 253 may include information about the total message length of BSM part 2. The Merge_REQ field or Merge_ACK field 255 may include a merge request message or a merge approval message. The time-to-merge field 259 may include information about the estimated time of arrival (TTM) at the merging point.

Figure 5:
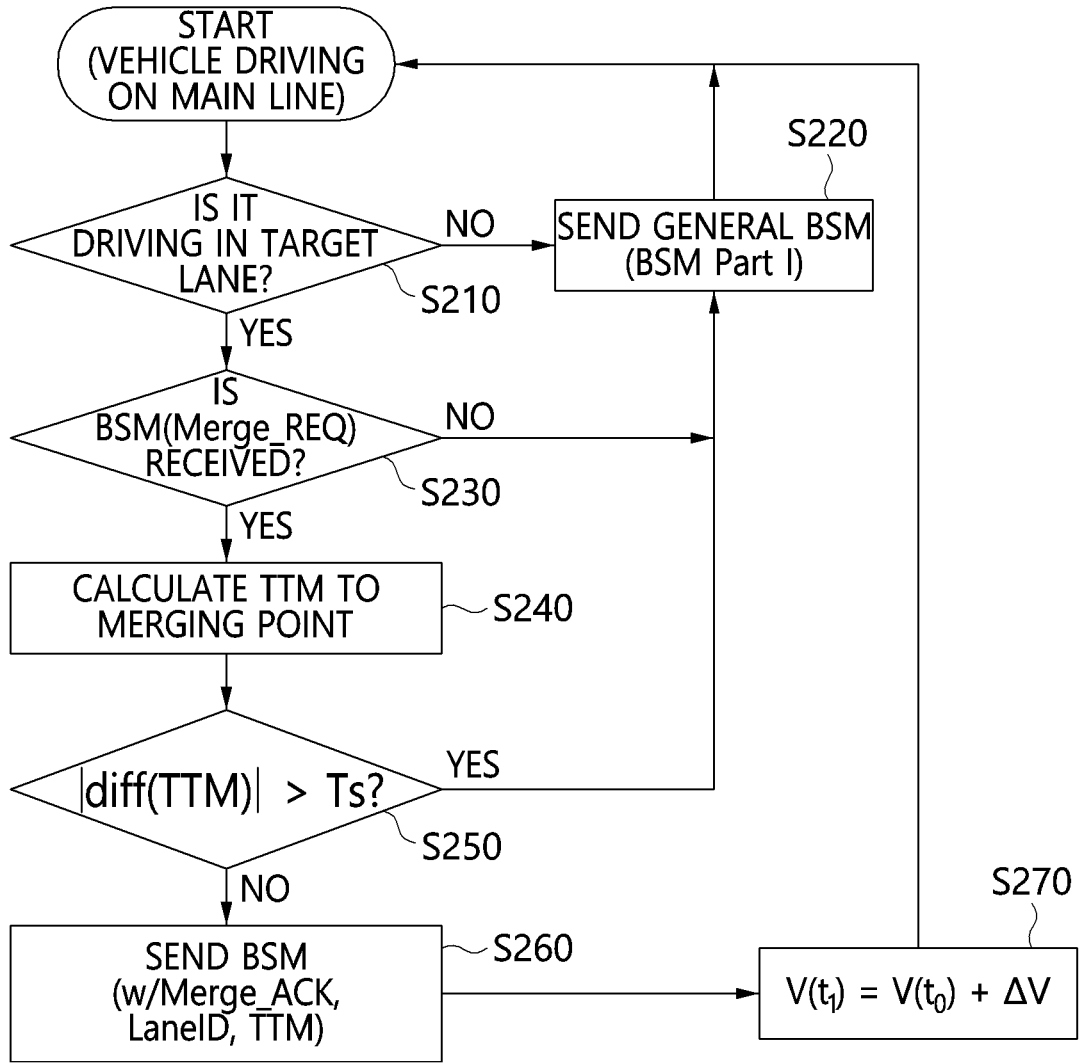
FIG. 5 is a flowchart illustrating an autonomous vehicle control method performed by a vehicle driving on a main line according to the first embodiment of the present disclosure.

FIG. 5 is a flowchart illustrating an autonomous vehicle control method performed by a vehicle driving on a main line according to the first embodiment of the present disclosure. Here, the autonomous vehicle in FIG. 5 may be a vehicle driving on the main line.

Referring to FIG. 5, the control apparatus of the autonomous vehicle may determine at step S210 whether the autonomous vehicle is driving in a target lane to accommodate merging traffic. For example, the target lane may be the second lane of the main line illustrated in FIG. 2.

The control apparatus of the autonomous vehicle may broadcast a general BSM to surroundings at step S220 when it determines that the autonomous vehicle is not driving in the target lane.

When it determines that the autonomous vehicle is driving in the target lane, the control apparatus of the autonomous vehicle may determine whether it receives a merge request message from a merging vehicle at step S230.

When a merge request message is not received, the control apparatus of the autonomous vehicle may broadcast a general BSM to surroundings at step S220.

When it receives a merge request message, the control apparatus of the autonomous vehicle may calculate the estimated time of arrival of the autonomous vehicle at a merging point (TTM) at step S240.

The control apparatus of the autonomous vehicle may determine whether a collision with the merging vehicle will occur based on the estimated time of arrival of the autonomous vehicle at the merging point and the estimated time of arrival of the merging vehicle at the merging point.

For example, when the difference between the estimated time of arrival of the autonomous vehicle at the merging point and the estimated time of arrival of the merging vehicle at the merging point is less than a preset threshold value Ts, a collision with the merging vehicle is expected at step S250.

When a collision with the merging vehicle is expected, the control apparatus of the autonomous vehicle broadcasts a BSM including a merge approval message to surroundings, thereby providing the same to the merging vehicle at step S260. The frequency of broadcasting of the BSM may be set to 10 Hz, but is not limited thereto.

Additionally, the control apparatus of the autonomous vehicle may accelerate the autonomous vehicle to increase the current driving speed in order to avoid a collision with the merging vehicle at step S270.

The control apparatus of the autonomous vehicle according to the first embodiment is effective for reducing radio interference when there is a large number of vehicles.

Figure 6:
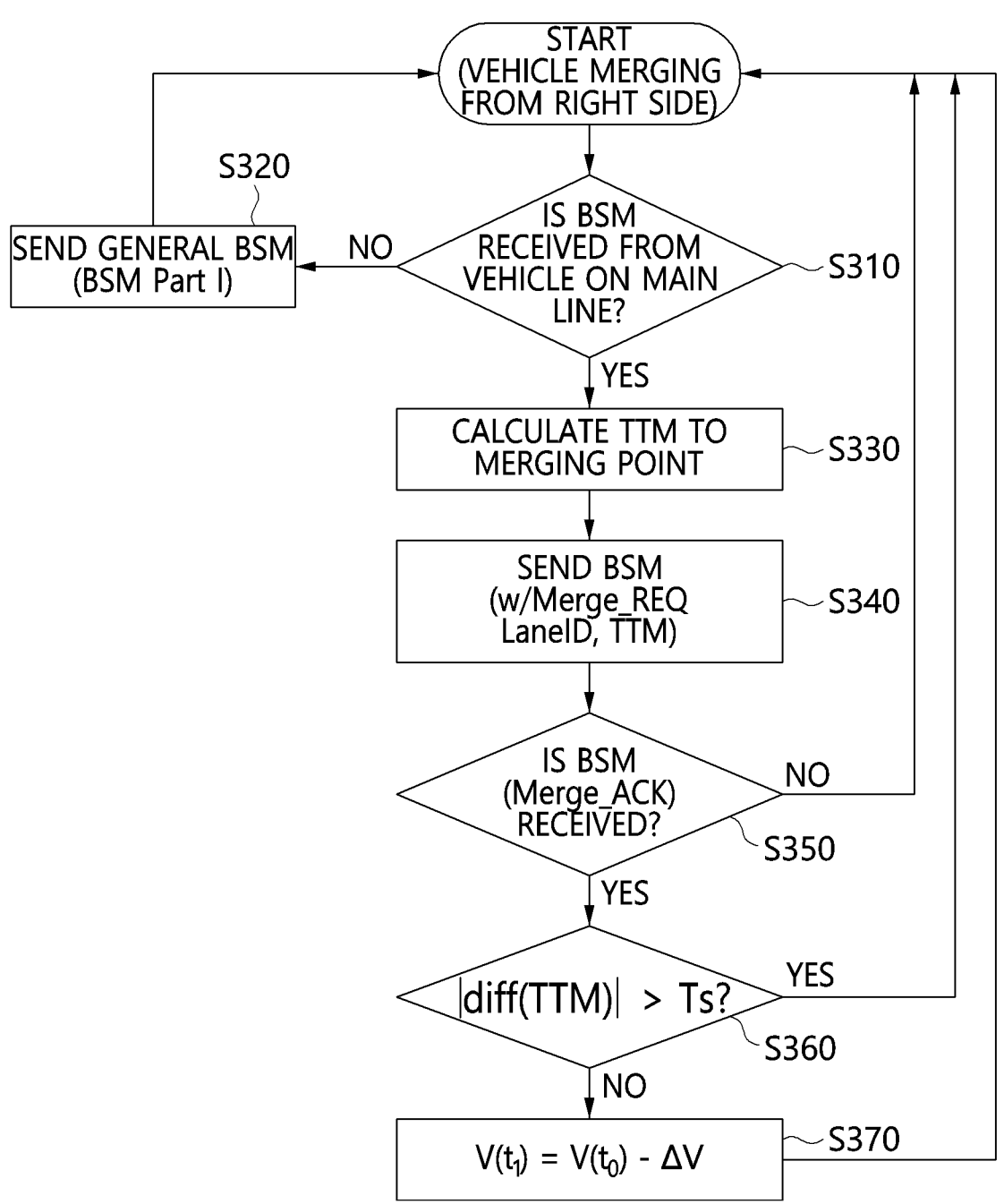
FIG. 6 is a flowchart illustrating an autonomous vehicle control method performed by a merging vehicle according to the first embodiment of the present disclosure.

FIG. 6 is a flowchart illustrating an autonomous vehicle control method performed by a merging vehicle according to the first embodiment of the present disclosure. Here, the autonomous vehicle in FIG. 6 may be a merging vehicle.

Referring to FIG. 6, the control apparatus of the autonomous vehicle may check whether a BSM is received from a vehicle driving on a main line at step S310.

When a BSM is not received from the vehicle driving on the main line, the control apparatus of the autonomous vehicle may send a general BSM at step S320.

When it receives a BSM from the vehicle driving on the main line, the control apparatus of the autonomous vehicle may calculate the estimated time of arrival of the merging vehicle at a merging point at step S330.

The control apparatus of the autonomous vehicle may send a BSM including a merge request message at step S340.

The control apparatus of the autonomous vehicle may check whether a BSM including a merge approval message is received from the vehicle driving on the main line at step S350.

When it receives a BSM including a merge approval message, the control apparatus of the autonomous vehicle checks whether the difference between the estimated time of arrival of the merging vehicle at the merging point and the estimated time of arrival of the vehicle driving on the main line at the merging point is less than a preset threshold value Ts, thereby determining whether a collision will occur at step S360.

When a collision with the vehicle driving on the main line is expected, the control apparatus of the autonomous vehicle may control the speed of the merging vehicle so as to be decreased at step S370.

Figure 7:
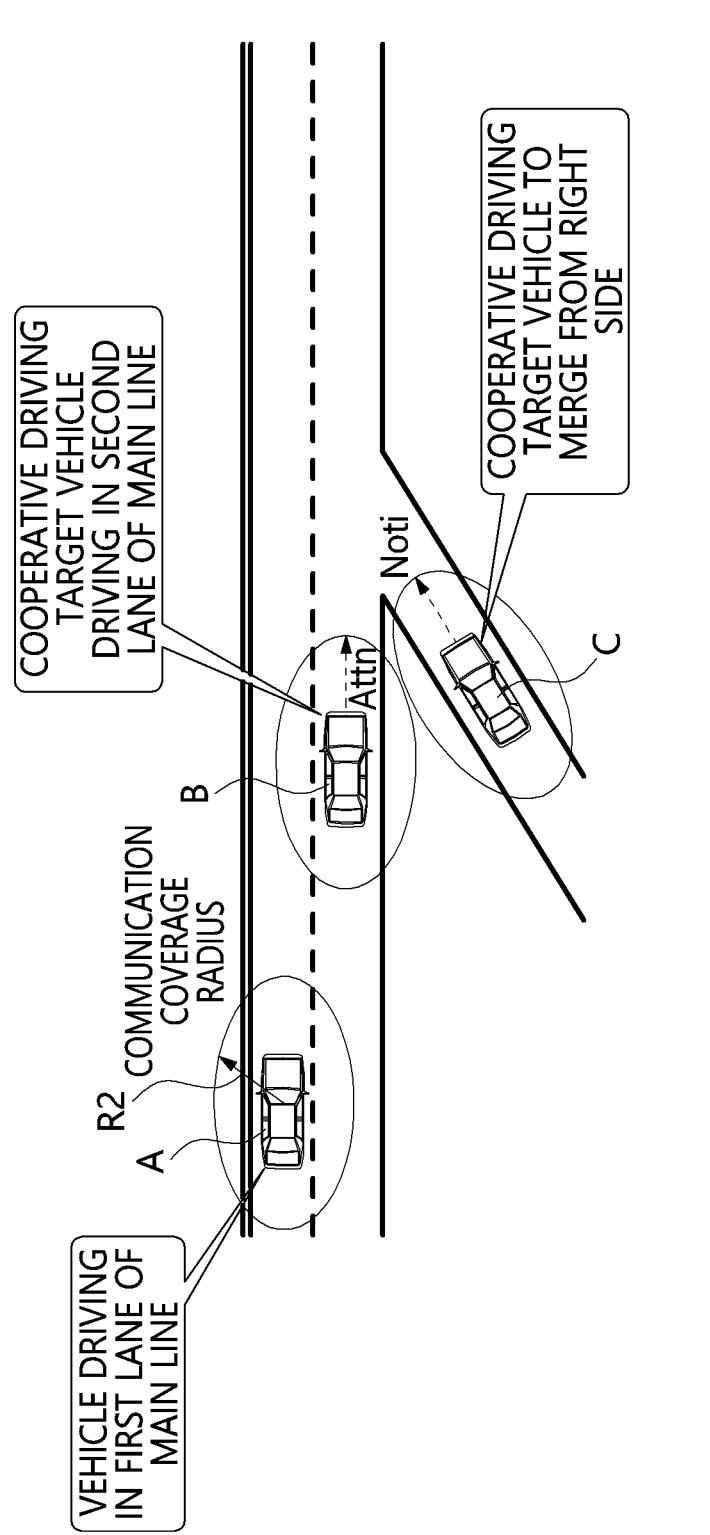
FIG. 7 is a view illustrating a cooperative driving scenario in a merging zone according to a second embodiment of the present disclosure.

FIG. 7 is a view illustrating a cooperative driving scenario in a merging zone according to a second embodiment of the present disclosure.

As illustrated in FIG. 7, a first vehicle A is driving in the first lane of a main line, a second vehicle B is driving in the second lane of the main line, and a merging vehicle C that wants to merge from the right side is driving on an on-ramp. Here, the vehicles driving in the lanes of the main line and the merging vehicle may be autonomous vehicles, but are not limited thereto.

The vehicles A and B driving in the lanes of the main line and the merging vehicle C are required to perform cooperative driving therebetween. Here, a communication device capable of V2X communication is installed in each of the vehicles, and it may have a communication coverage radius R2 corresponding to a certain range.

Merging from the right side may be performed using an active method in which the first vehicle A, the second vehicle B, and the merging vehicle C broadcast messages that are required in order to pass a merging point, regardless of BSMs broadcast by the counterpart.

Figure 8:
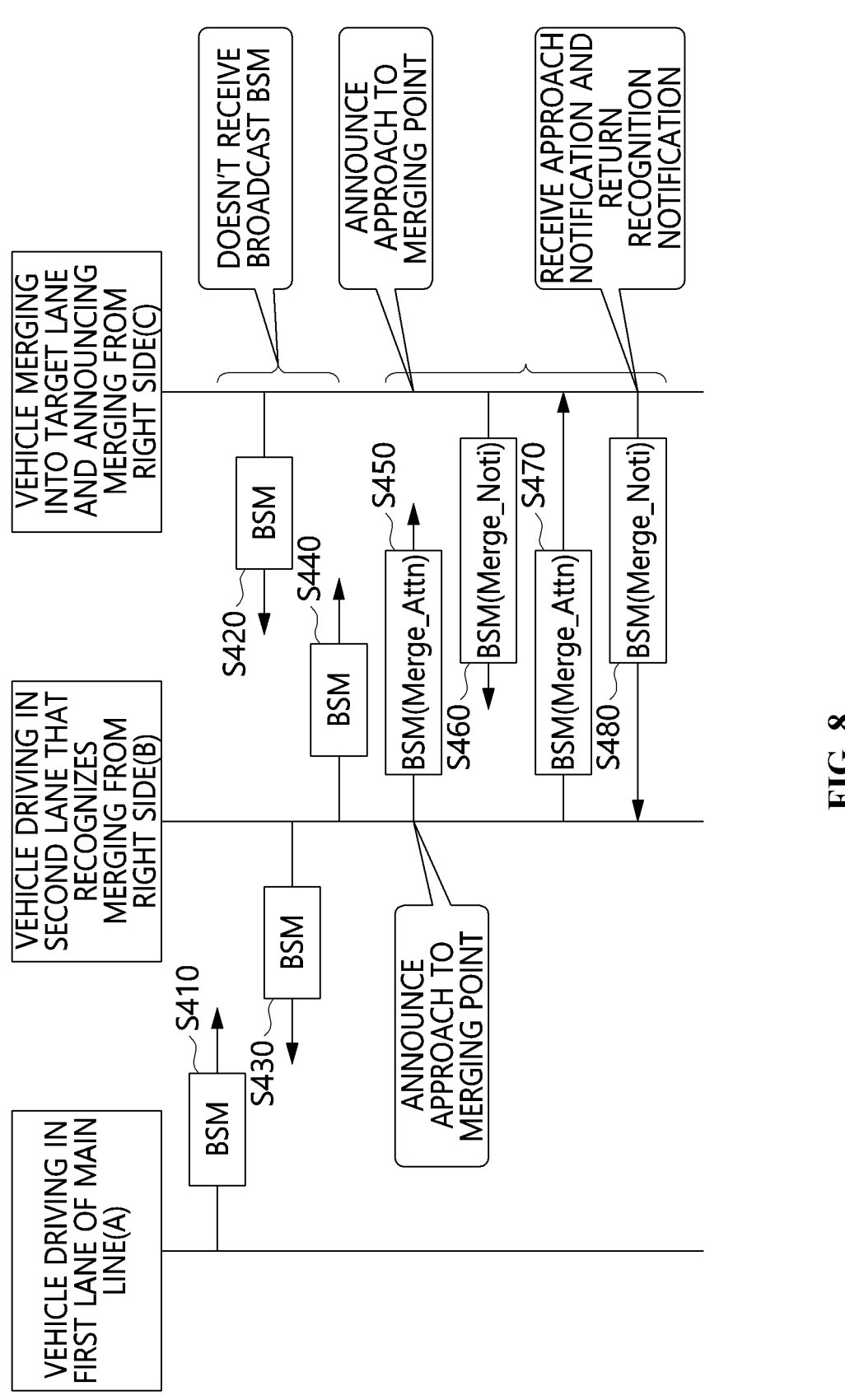
FIG. 8 is a view illustrating a driving negotiation protocol in a merging zone according to the second embodiment of the present disclosure.

FIG. 8 is a view illustrating a driving negotiation protocol in a merging zone according to the second embodiment of the present disclosure.

As illustrated in FIG. 8, vehicles driving on a main line and merging vehicles to merge into a target lane broadcast BSMs to surroundings, thereby providing driving information thereof.

For example, a first vehicle driving in the first lane of the main line may send a BSM to a second vehicle that is driving in the second lane of the main line and capable of recognizing merging from the right side at step S410. The merging vehicle may send a BSM to the second vehicle driving in the second lane of the main line at step S420. The second vehicle driving in the second lane of the main line may send a BSM to the first vehicle driving in the first lane of the main line at step S430. The second vehicle driving in the second lane of the main line may send a BSM to the merging vehicle at step S440.

When it comes within a specific merging distance Md to a merging point, the second vehicle driving in the second lane of the main line broadcasts an approach notification message BSM(Merge_Attn), which is a message required for cooperative driving for merging from the right side, at step S450. Similarly, the merging vehicle on an on-ramp on the right side may broadcast an approach notification message BSM(Merge_Noti) when it comes within the specific merging distance Md to the merging point S460.

When it receives the approach notification message, the second vehicle driving in the second lane of the main line may send an approach recognition message to the merging vehicle at step S470. Similarly, the merging vehicle may send an approach recognition message to the vehicle driving on the main line at step S480 when it receives an approach notification message.

The approach notification messages and the approach recognition messages between the second vehicle driving in the second lane of the main line and the merging vehicle are continually broadcast at specific intervals, and may be repeated until the merging vehicle completes merging from the right side.

When the second vehicle driving in the second lane of the main line and the merging vehicle pass the merging point, they may broadcast BSMs from which an approach notification message or an approach recognition message is excluded.

As described above, the vehicles passing the merging point broadcast attention messages to nearby vehicles, whereby safe cooperative driving may be achieved.

Figure 9:
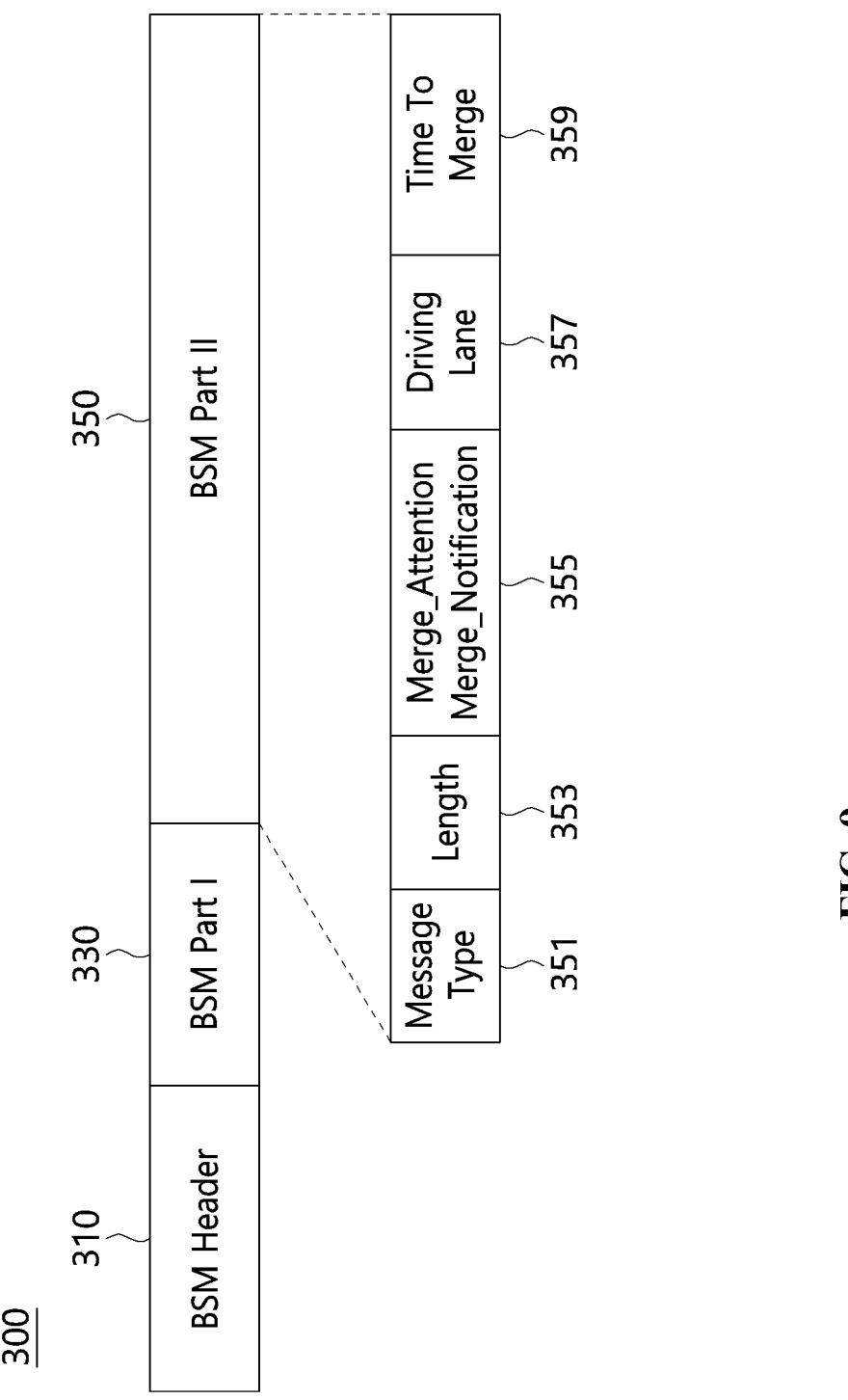
FIG. 9 is a view illustrating a message frame format according to the second embodiment of the present disclosure.

FIG. 9 is a view illustrating a message frame format according to the second embodiment of the present disclosure.

As illustrated in FIG. 9, a BSM 300 according to the second embodiment may be configured such that a BSM header 310, which is frame header information for sending the BSM, is located at the front. After the BSM header 310, BSM part 1 330 for broadcasting speed and location information, which is the basic driving information of a vehicle, may be located.

After BSM part 1 330, BSM part 2 350, including a message type field 351, a length field 353, a Merge_Attention or Merge_Notification field 355, a driving lane field 357, and a time-to-merge field 359, may be located. Here, BSM part 2 350 may be a region including approach notification message information or approach recognition message information.

The message type field 351 may include information indicating that the message is related to a driving negotiation for merging from the right side. The length field 353 may include information about the total message length of BSM part 2. The Merge_Attention/Merge_Notification field 355 may include an approach notification message or an approach recognition message. The time-to-merge field 359 may include information about the estimated time of arrival at the merging point.

Figure 10:
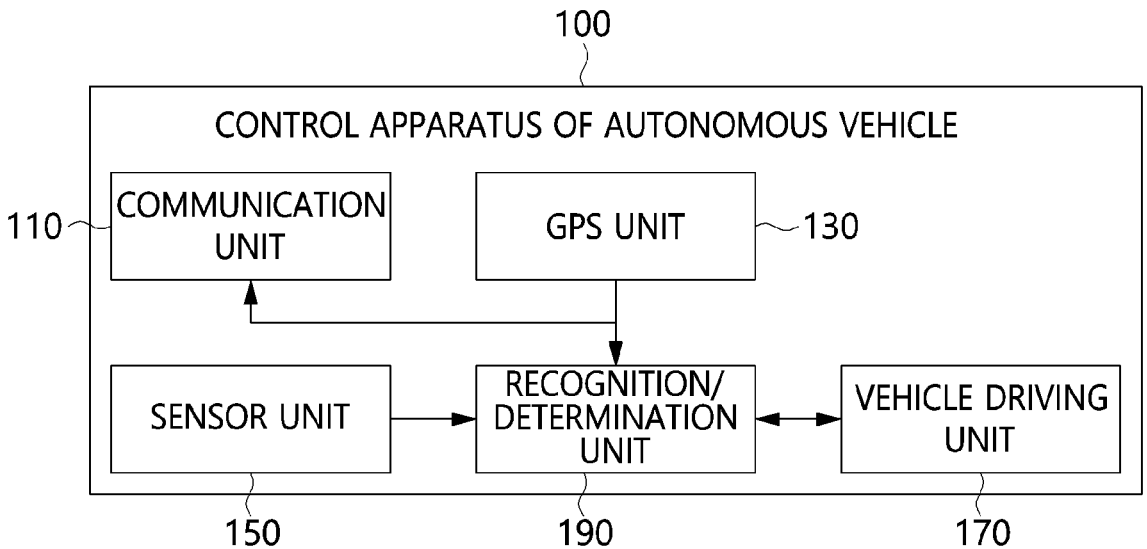
FIG. 10 is a flowchart illustrating an autonomous vehicle control method performed by a vehicle driving on a main line according to the second embodiment of the present disclosure.

FIG. 10 is a flowchart illustrating an autonomous vehicle control method performed by a vehicle driving on a main line according to the second embodiment of the present disclosure. The autonomous vehicle of FIG. 10 may be a vehicle driving on the main line.

As illustrated in FIG. 10, the control apparatus of the autonomous vehicle may check at step S510 whether the autonomous vehicle is driving in a target lane to accommodate merging traffic.

The control apparatus of the autonomous vehicle may send a general BSM at step S520 when it determines that the autonomous vehicle is not driving in the target lane.

The control apparatus of the autonomous vehicle may calculate the remaining distance to a merging point at step S530.

The control apparatus of the autonomous vehicle may calculate the estimated time of arrival of the autonomous vehicle at the merging point when the remaining distance to the merging point is less than a preset distance at step S540.

The control apparatus of the autonomous vehicle may send an approach notification message, which is a BSM including approach notification information, to the merging vehicle at step S550.

The control apparatus of the autonomous vehicle may check whether it receives an approach recognition message, which is a BSM including approach recognition information, from the merging vehicle at step S560.

When it receives the approach recognition message from the merging vehicle, the control apparatus of the autonomous vehicle may check whether the difference between the estimated time of arrival of the autonomous vehicle at the merging point and the estimated time of arrival of the merging vehicle at the merging point is less than a preset threshold value Ts at step S570.

The control apparatus of the autonomous vehicle may predict that a collision with the merging vehicle will occur when the difference between the estimated time of arrival of the autonomous vehicle at the merging point and the estimated time of arrival of the merging vehicle at the merging point is less than the preset threshold value Ts.

The control apparatus of the autonomous vehicle may control the speed of the autonomous vehicle to increase the same at step S580 when a collision with the merging vehicle is expected.

Figure 11:
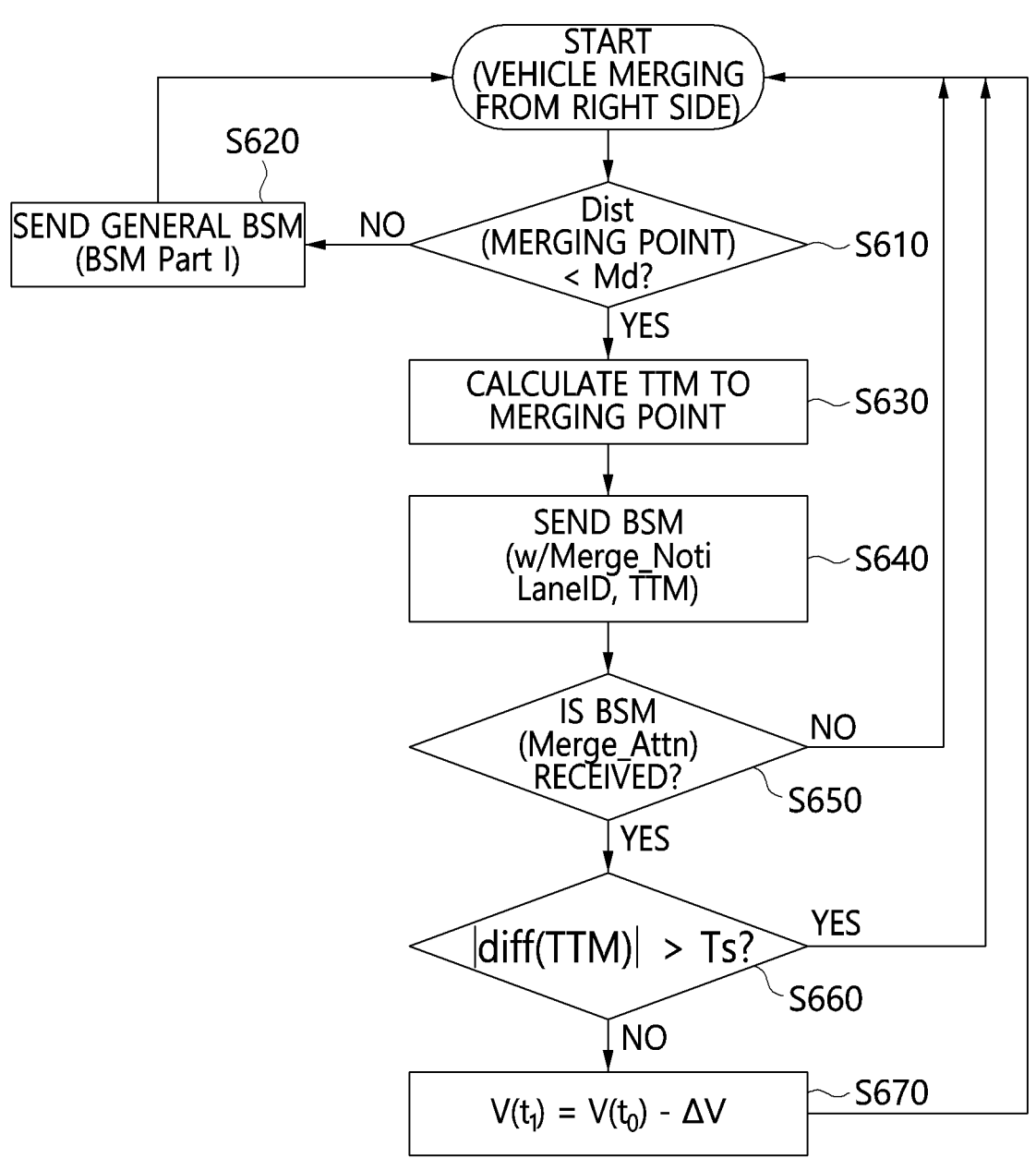
FIG. 11 is a flowchart illustrating an autonomous vehicle control method performed by a merging vehicle according to the second embodiment of the present disclosure.

FIG. 11 is a flowchart illustrating an autonomous vehicle control method performed by a merging vehicle according to the second embodiment of the present disclosure. The autonomous vehicle of FIG. 11 may be a merging vehicle.

As illustrated in FIG. 11, the control apparatus of the autonomous vehicle may calculate the remaining distance of the merging vehicle to a merging point at step S610.

When the remaining distance to the merging point is less than a preset distance, the control apparatus of the autonomous vehicle may calculate the estimated time of arrival of the merging vehicle at the merging point at step S630.

The control apparatus of the autonomous vehicle may send an approach notification message, which is a BSM including approach notification information, to a vehicle driving on a main line at step S640.

The control apparatus of the autonomous vehicle may check whether an approach recognition information, which is a BSM including approach recognition information, is received from the vehicle driving on the main line at step S650.

When it receives the approach recognition information from the vehicle driving on the main line, the control apparatus of the autonomous vehicle may check whether the difference between the estimated time of arrival of the merging vehicle at the merging point and the estimated time of arrival of the vehicle driving on the main line at the merging point is less than a preset threshold value Ts at step S660.

When the difference between the estimated time of arrival of the merging vehicle at the merging point and the estimated time of arrival of the vehicle driving on the main line at the merging point is less than the preset threshold value Ts, the control apparatus of the autonomous vehicle may predict that a collision with the vehicle driving on the main line will occur.

The control apparatus of the autonomous vehicle may control the speed of the merging vehicle so as to decrease the same at step S670 when a collision with the vehicle driving on the main line is expected.

The recognition/determination unit of the control apparatus of the autonomous vehicle according to an embodiment may be implemented in a computer system including a computer-readable recording medium.

Figure 12:
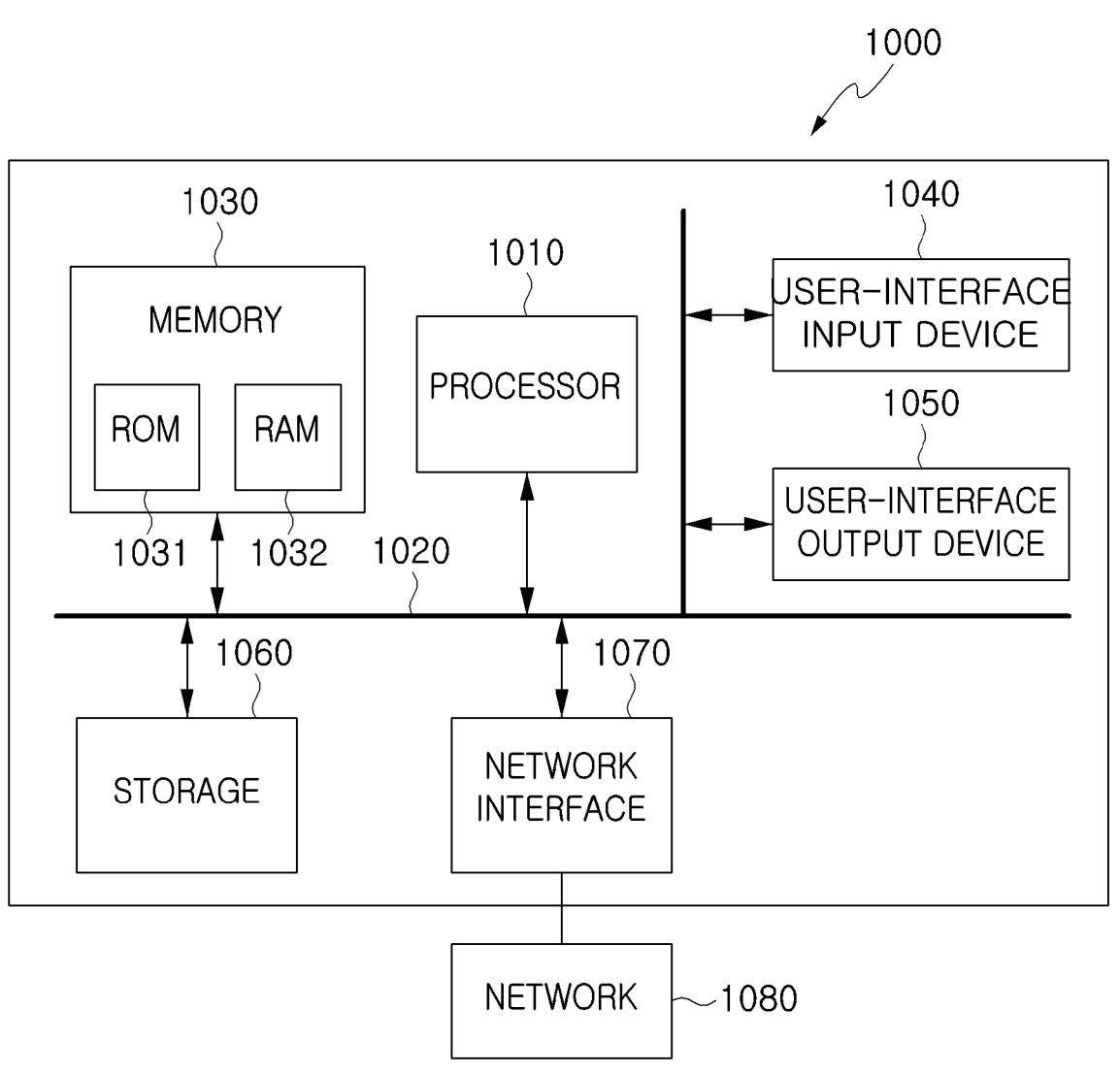
FIG. 12 is a block diagram illustrating the configuration of a computer system according to an embodiment.

FIG. 12 is a block diagram illustrating the configuration of a computer system according to an embodiment.

Referring to FIG. 12, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the recognition/determination unit.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for controlling an autonomous vehicle according to an embodiment. Specifically, the memory may store multiple applications running in the recognition/determination unit and data and instructions for operation of the recognition/determination unit.

The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to an embodiment, the computer-readable recording medium storing a computer program therein may contain instructions for making a processor perform a method including the control operation of the autonomous vehicle in FIGS. 5, 6, 10 and 11.

According to an embodiment, a computer program stored in the computer-readable recording medium may include instructions for making a processor perform the method for controlling an autonomous vehicle in FIGS. 5, 6, 10, and 11.

According to the present disclosure, autonomous vehicles or connected vehicles share the driving intention with each other through communication, thereby achieving safe cooperative driving.

Also, the present disclosure provides a driving negotiation protocol, thereby enabling fast cooperative driving.

Also, the present disclosure proposes a reactive method and an active method, thereby improving efficiency of cooperative driving in consideration of a traffic condition on a road, radio congestion, and the like.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for controlling a cooperative vehicle driving in a lane of a main line, comprising:
   determining whether the cooperative vehicle is driving in a target lane to accommodate merging traffic;
   determining whether a merge request message is received from a merging vehicle intending to merge into the target lane when the cooperative vehicle is determined to drive in the target lane;
   determining whether a collision with the merging vehicle will occur based on the merge request message when the merge request message is received; and
   sending a merge approval message to the merging vehicle when the collision with the merging vehicle is expected, wherein when a collision with the merging vehicle is expected, the merge approval message is transmitted to the merging vehicle, and the speed of the cooperative vehicle is controlled to be increased or decreased to avoid the collision with the merging vehicle,
   wherein the cooperative vehicle driving in the target lane broadcasts a Basic Safety Message (Merge_Attn) for cooperative driving when it enters within a predetermined merging distance (Md) from a merging point,
   the merging vehicle broadcasts a Basic Safety Message (Merge_Noti) for merge notification when it enters within the predetermined merging distance (Md) from the merging point, and
   the collision with the merging vehicle is determined based on whether the cooperative vehicle and the merging vehicle have received each other's approach recognition messages.

2. The method of claim 1, wherein the merge request message includes an estimated time of arrival of the merging vehicle at a merging point.

3. The method of claim 2, wherein determining whether the collision with the merging vehicle will occur includes:

calculating an estimated time of arrival of the cooperative vehicle at the merging point; and determining whether the collision with the merging vehicle will occur based on the estimated time of arrival of the cooperative vehicle at the merging point and the estimated time of arrival of the merging vehicle at the merging point.

4. The method of claim 3, wherein whether the collision with the merging vehicle will occur is determined by comparing a difference between the estimated time of arrival of the cooperative vehicle at the merging point and the estimated time of arrival of the merging vehicle at the merging point with a preset threshold value.

5. The method of claim 1, wherein the merge approval message includes driving lane information of the cooperative vehicle and an estimated time of arrival of the cooperative vehicle at a merging point.

6. The method of claim 1, further comprising:

controlling, by the cooperative vehicle, speed of the cooperative vehicle so as to prevent the collision with the merging vehicle.

7. The method of claim 1, wherein the merge request message and the merge approval message are periodically sent until merging of the merging vehicle is completed.

8. A method for controlling a merging vehicle to merge into a target lane, comprising:

calculating an estimated time of arrival of the merging vehicle at a merging point when a Basic Safety Message (BSM) is received from a cooperative vehicle driving in the target lane;

sending a merge request message, including driving lane information of the merging vehicle and the estimated time of arrival of the merging vehicle at the merging point, to the cooperative vehicle driving in the target lane;

determining whether a merge approval message is received from the cooperative vehicle driving in the target lane;

determining whether a collision with the cooperative vehicle driving in the target lane will occur based on the merge approval message when the merge approval message is received; and controlling speed of the merging vehicle when the collision with the cooperative vehicle driving in the target lane is expected, wherein the cooperative vehicle driving in the target lane broadcasts a Basic Safety Message (Merge_Attn) for cooperative driving when it enters within a predetermined merging distance (Md) from a merging point, the merging vehicle broadcasts a Basic Safety Message (Merge_Noti) for merge notification when it enters within the predetermined merging distance (Md) from the merging point, and the collision with the merging vehicle is determined based on whether the cooperative vehicle and the merging vehicle have received each other's approach recognition messages.

9. The method of claim 8, wherein the merge approval message includes driving lane information of the cooperative vehicle driving in the target lane and an estimated time of arrival of the cooperative vehicle driving in the target lane at the merging point.

10. The method of claim 9, wherein whether the collision with the cooperative vehicle driving in the target lane will occur is determined based on the estimated time of arrival of the merging vehicle at the merging point and the estimated time of arrival of the cooperative vehicle driving in the target lane at the merging point.

11. The method of claim 10, wherein whether the collision with the cooperative vehicle driving in the target lane will occur is determined by comparing a difference between the estimated time of arrival of the merging vehicle at the merging point and the estimated time of arrival of the cooperative vehicle driving in the target lane at the merging point with a preset threshold value.

12. A method for controlling a vehicle, comprising:

calculating an estimated time of arrival of the vehicle at a merging point based on a remaining distance to the merging point;

sending an approach notification message including the estimated time of arrival of the vehicle at the merging point to a nearby vehicle;

determining whether a collision with the nearby vehicle will occur based on an approach recognition message when the approach recognition message is received from the nearby vehicle; and controlling the vehicle so as to prevent the collision with the nearby vehicle when the collision with the nearby vehicle is expected, wherein the approach notification message is transmitted when the vehicle enters within a predetermined merging distance (Md) from the merging point, and wherein the approach notification message includes a Basic Safety Message (Merge_Attn) for cooperative driving and a Basic Safety Message (Merge_Noti) for merge notification, wherein, when the vehicle is a cooperative vehicle driving in a target lane, the cooperative vehicle broadcasts a Basic Safety Message (Merge_Attn) for cooperative driving when it enters within a predetermined merging distance (Md) from a merging point, wherein, when the vehicle is a merging vehicle to merge into a target lane, the merging vehicle broadcasts a Basic Safety Message (Merge_Noti) for merge notification when it enters within the predetermined merging distance (Md) from the merging point, and wherein the collision is determined based on whether the cooperative vehicle and the merging vehicle have received each other's approach recognition messages.

13. The method of claim 12, wherein calculating the estimated time of arrival of the vehicle at the merging point includes:

calculating the remaining distance of the vehicle to the merging point in a state in which the vehicle is driving in a target lane to accommodate merging traffic; and calculating the estimated time of arrival of the vehicle at the merging point when the remaining distance is less than a preset distance.

14. The method of claim 12, wherein the approach recognition message includes an estimated time of arrival of the nearby vehicle at the merging point.

15. The method of claim 14, wherein whether the collision with the nearby vehicle will occur is determined based on the estimated time of arrival of the vehicle at the merging point and the estimated time of arrival of the nearby vehicle at the merging point.

16. The method of claim 15, wherein whether the collision with the nearby vehicle will occur is determined by comparing a difference between the estimated time of arrival of the vehicle at the merging point and the estimated time of arrival of the nearby vehicle at the merging point with a preset threshold value.

17. The method of claim 12, wherein the vehicle is the cooperative vehicle driving in a target lane, and the nearby vehicle is the merging vehicle to merge into the target lane.

18. The method of claim 17, wherein the cooperative vehicle driving in the target lane is controlled to change a lane or to increase or decrease speed thereof in order to prevent a collision with the merging vehicle.

19. The method of claim 12, wherein the vehicle is the merging vehicle to merge into a target lane, and the nearby vehicle is the cooperative vehicle driving in the target lane.

20. The method of claim 19, wherein the merging vehicle is controlled to decrease speed thereof in order to prevent a collision with the cooperative vehicle driving in the target lane.

* * * * *